Feb. 27, 1923.

M. E. GYSEL 1,446,898

STATOR STRUCTURE FOR DYNAMO-ELECTRIC MACHINES

Filed Dec. 13, 1917

WITNESSES:
W. S. Reece
F. A. Lind

INVENTOR
Max E Gysel
BY
Wesley G. Carr
ATTORNEY

Patented Feb. 27, 1923.

1,446,898

UNITED STATES PATENT OFFICE.

MAX E. GYSEL, OF WILKINSBURG, PENNSYLVANIA, ASSIGNOR TO WESTINGHOUSE ELECTRIC AND MANUFACTURING COMPANY, A CORPORATION OF PENNSYLVANIA.

STATOR STRUCTURE FOR DYNAMO-ELECTRIC MACHINES.

Application filed December 13, 1917. Serial No. 207,010.

*To all whom it may concern:*

Be it known that I, MAX E. GYSEL, a citizen of the Republic of Switzerland, and a resident of Wilkinsburg, in the county of Allegheny and State of Pennsylvania, have invented a new and useful Improvement in Stator Structures for Dynamo-Electric Machines, of which the following is a specification.

My invention relates to stator structures for dynamo-electric machines, and it has for its object to provide apparatus of the character designated which shall be simple and inexpensive in manufacture, rugged in construction and well adapted for ventilation, said structure further being particularly adapted for inspection and repair.

Figure 1:
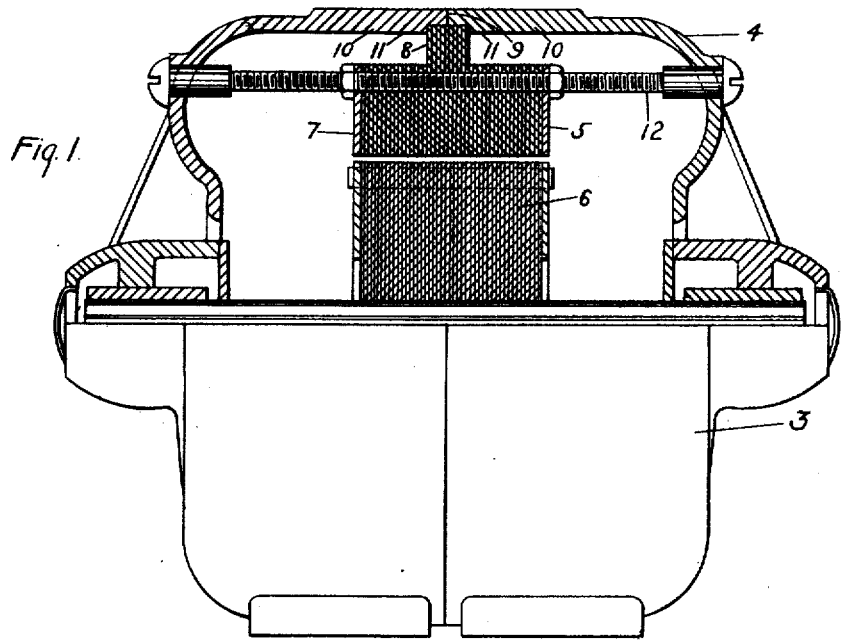
Figure 2:
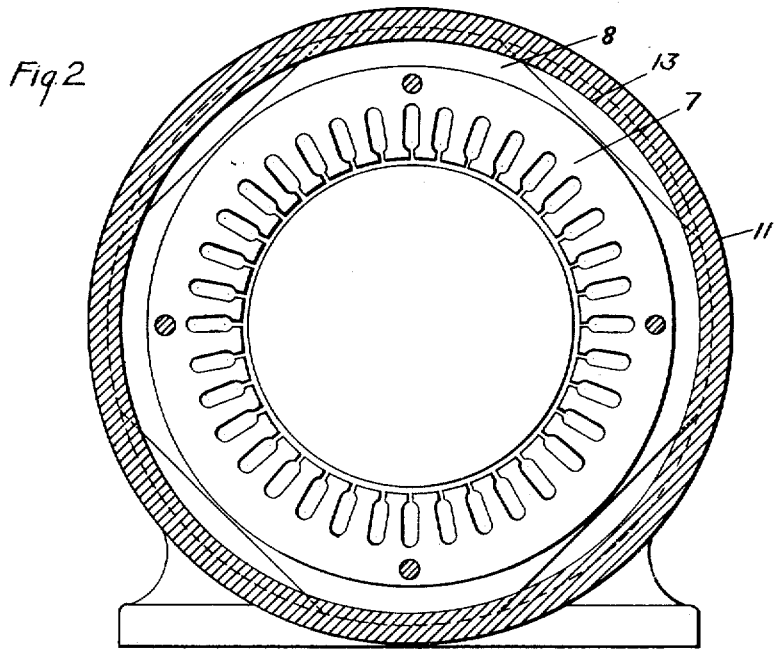

In the accompanying drawing, Fig. 1 is a side view, partially in section and partially in elevation, of a dynamo-electric machine embodying my invention; and Fig. 2 is a transverse sectional view of the stator of the machine shown in Fig. 1.

Small dynamo-electric machines usually embody hollow cylindrical frame members within which laminated core members are mounted. Various means have been proposed for so mounting the core members within the frame members as to permit of ready insertion and removal and to ensure accurate and secure positioning.

In accordance with the present invention, I form a cylindrical frame member by disposing two cylindrical members in end-to-end relation, said members being provided with opposing shoulders adjacent their abutting faces, and I further provide a core member having projections which extend between said shoulders. By means of bolts, the cylindrical members are secured together and firm positioning of said shoulders upon said projections is secured.

I preferably form the greater portion of the core member of circular laminations but I provide a small number of the laminations, at the central portion thereof, of polygonal external contour to be engaged by the above-mentioned shoulders. The circular laminations are preferably somewhat smaller in diameter than the interior of the frame, whereby a ventilating space is provided between the core and the frame member.

Referring to the drawing for a more detailed understanding of my invention, I show a dynamo-electric machine at 3 in Fig. 1, said machine comprising a stator frame member 4, a stator core member 5 and a rotor core member 6. Any suitable windings may be applied to the core members 5 and 6, the specific winding employed forming no part of the present invention.

The stator core member 5 is formed of a large number of circular laminations, indicated at 7—7, but, at its central portion, embodies a small number of polygonal laminations 8—8, the corners of said polygonal laminations extending beyond the core member defined by the laminations 7—7.

The frame 4 is split transversely to the axis, as indicated at 9, and the two halves thereof are provided with opposing shoulders 10—10 adjacent the abutting faces. The corners of the polygonal laminations 8—8 extend between the shoulders 10—10, as indicated at 11—11, and fastening means extend through the entire stator structure as indicated at 12.

By manipulating the members 12, the two portions of the frame structure may be drawn into a firm engagement with each other, to preclude the admission of foreign matter to the interior of the machine frame. Furthermore, the penetration of the core member 5 by the clamping member 12 aids in firmly positioning the core member.

The laminations 7—7 are, preferably, somewhat smaller in diameter than the interior of the frame 4—4, whereby a ventilating space is provided between the core member and the frame and, furthermore, the ventilating spaces on the two sides of the laminations 8 communicate through the openings provided at 13.

It will be obvious that, with the structure disclosed, the removal of the members 12—12 permits the ready separation of the two halves of the frame member 4 and the complete exposure of the stator core member 5 for inspection, cleaning and repair.

While I have shown my invention in its preferred form, it will be obvious to those skilled in the art that it is susceptible of various minor changes and modifications without departing from the spirit thereof, and I desire, therefore, that only such limitations shall be placed thereupon as are imposed by the prior art or as are specifically set forth in the appended claims.

I claim as my invention:

1. A dynamo-electric machine comprising a casing consisting of a plurality of sections disposed in end-to-end abutting relation with respect to each other, a laminated core member disposed within said casing and provided with a relatively narrow centrally disposed flange which is adapted to extend outwardly from the main body portion of said core and between said sections, and means for clamping the laminations of the core together and for drawing said sections toward each other to clamp the flanged portion of said core therebetween.

2. A dynamo electric machine comprising a casing consisting of a plurality of sections disposed in end-to-end abutting relation, a core member disposed within said casing and provided with a relatively narrow projection adapted to extend between said sections, and means for clamping said sections together.

3. A dynamo-electric machine comprising a casing consisting of a plurality of sections disposed in end-to-end abutting relation, a laminated member disposed within said casing, certain of the laminations of said core member having a greater diameter than the body portion thereof and which form a relatively narrow rib adapted to extend between said sections, and means for clamping said sections together.

4. A dynamo-electric machine comprising a casing consisting of a plurality of sections disposed in end-to-end relation and in axial alinement with each other, said sections being provided with opposing shoulders adjacent to their abutting edges, a core member disposed within said frame and having a plurality of relatively narrow projections adapted to extend between said shoulders, and means for clamping said sections together.

5. A dynamo-electric machine comprising a casing consisting of a plurality of sections disposed in end-to-end abutting relation and in axial alinement with each other, said sections being provided with opposing shoulders adjacent to their abutting edges, a laminated core member disposed within said casing and in spaced relation with respect thereto, certain of the laminations of said core member extending outwardly from the body portion thereof and between said shoulders, and means for clamping said sections together.

6. A dynamo-electric machine comprising a casing consisting of a plurality of sections disposed in end-to-end abutting relation with respect to each other, said sections being provided with opposing shoulders adjacent to their abutting edges, a core member disposed within said casing and provided with relatively narrow rib portions adapted to extend between said shoulders, and means for clamping said sections together to maintain said core member in spaced relation with respect thereto to provide a ventilating passage between said core member and said casing.

7. A dynamo-electric machine comprising a casing consisting of a plurality of sections disposed in end-to-end abutting relation and in axial alinement with respect to each other, said sections being provided with opposing shoulders adjacent to their abutting edges, a laminated core member disposed within said casing and having certain of the laminations thereof extending outwardly from the body portion of the core member to provide a plurality of radial projections adapted to be clamped between said shoulders, the laminations of said core members which are not directly engaged by said shoulders being spaced from said casing to provide a circumferential ventilating passageway.

8. In a dynamo-electric machine, the combination with a cylindrical frame comprising two cylindrical members disposed in axial alinement and in end-to-end abutting relation, said members being provided with opposing shoulders adjacent their abutting faces, of a laminated core structure disposed within said frame, certain centrally disposed laminations of said core member being polygonal in shape, the corners of said polygonal laminations protruding from said core member and projecting between said shoulders, and means for clamping said cylindrical members together.

9. In a dynamo-electric machine, the combination with a cylindrical frame comprising two cylindrical members disposed in axial alinement and in end-to-end abutting relation, said members being provided with opposing shoulders adjacent to their abutting faces, of a laminated core structure disposed within said frame, certain centrally disposed laminations of said core member being polygonal in shape, the corners of said polygonal laminations protruding from said core member and projecting between said shoulders, and means for clamping said cylindrical members together and for simultaneously clamping said polygonal laminations between said shoulders, whereby said core member is positioned with respect to said frame, certain other laminations of said core member being spaced from said frame, whereby a ventilating space is provided.

10. In a dynamo-electric machine, the combination with a cylindrical frame comprising two cylindrical members disposed in axial alinement and in end-to-end abutting relation, said members being provided with opposing shoulders adjacent to their abutting faces, of a laminated core structure disposed within said frame, certain centrally disposed laminations of said core member being polygonal in shape, the corners of said polygonal laminations protruding from said core member and projecting between said shoulders, and threaded members extending through said cylindrical members and said core member, whereby said cylindrical members may be clamped together and said polygonal laminations may simultaneously be clamped between said shoulders, for positioning said core member relatively to said frame.

11. A dynamo-electric machine comprising a casing consisting of a plurality of sections arranged in abutting relation with respect to each other, a core member disposed within said casing and entirely enclosed thereby, said core member being provided with a plurality of relatively narrow radially projecting flanges adapted to be clamped between said sections to maintain said core in spaced relation with respect to said casing.

12. In a dynamo-electric machine, the combination of a casing comprising a plurality of sections arranged in abutting relation, and a core member inclosed by said casing having a plurality of projecting portions held between said sections whereby the main portion of said core is maintained in spaced relation with respect to said casing.

13. A dynamo-electric machine comprising a casing consisting of a plurality of sections arranged in end-to-end abutting relation with respect to each other, said sections being provided with annular reduced portions adjacent to their abutting edges, and a core member disposed within said casing and in spaced relation with respect thereto and having an outwardly extending portion of greater diameter than the main body portion thereof, which is adapted to extend into said reduced portions and be clamped between said sections to maintain said body portion in spaced relation with respect to said casing.

14. A dynamo-electric machine comprising a casing consisting of a plurality of sections arranged in end-to-end abutting relation with respect to each other, the inner peripheries of said sections being provided with reduced portions adjacent to their abutting edges and which are adapted to co-operate to provide an annular channel when said sections are secured together, a core member disposed within said casing and having a plurality of radially extending ribs adapted to extend into said channel to maintain said core in spaced relation with respect to said casing.

15. In a dynamo-electric machine, the combination of a casing comprising a plurality of sections, and a core having a plurality of radial extensions which project outwardly from the main portion thereof and are held between said sections.

16. A dynamo-electric machine comprising a casing consisting of a plurality of complementary sections adapted to be arranged in end-to-end abutting relation with respect to each other and a laminated core member disposed within said casing and which is entirely enclosed thereby, certain laminations of said core being of greater diameter than the main body portion thereof and which provide a plurality of relatively narrow ribs adapted to be clamped between said sections to maintain said core in spaced relation with respect to said casing.

In testimony whereof, I have hereunto subscribed my name this 30th day of Nov., 1917.

MAX E. GYSEL.